US009460905B2

(12) United States Patent
Aizikov et al.

(10) Patent No.: US 9,460,905 B2
(45) Date of Patent: Oct. 4, 2016

(54) METHOD OF ASSESSING VACUUM CONDITIONS IN A MASS SPECTROMETER WITH TRANSIENT SIGNAL DECAY RATES

(71) Applicant: Thermo Fisher Scientific (Bremen) GmbH, Bremen (DE)

(72) Inventors: Konstantin Aizikov, Bremen (DE); Dirk Nolting, Bremen (DE); Jan-Peter Hauschild, Weyhe (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 14/686,012

(22) Filed: Apr. 14, 2015

(65) Prior Publication Data

US 2015/0325424 A1 Nov. 12, 2015

(30) Foreign Application Priority Data

Apr. 14, 2014 (GB) .................................. 1406696.3

(51) Int. Cl.
*H01J 49/24* (2006.01)
*G01L 21/30* (2006.01)
*H01J 49/42* (2006.01)
*H01J 49/38* (2006.01)

(52) U.S. Cl.
CPC .............. *H01J 49/24* (2013.01); *G01L 21/30* (2013.01); *H01J 49/4265* (2013.01); *H01J 49/38* (2013.01); *H01J 49/425* (2013.01)

(58) Field of Classification Search
CPC ...... H01J 49/24; H01J 49/26; H01J 49/4265; H01J 49/425; H01J 49/0031; H01J 49/04; H01J 49/005; G01L 21/30
See application file for complete search history.

(56) References Cited

U.S. PATENT DOCUMENTS

| 5,436,447 A | 7/1995 | Shew |
| 5,625,186 A | 4/1997 | Frankevich et al. |
| 5,889,281 A * | 3/1999 | Holkeboer ............. H01J 41/10 250/282 |
| 2003/0001086 A1* | 1/2003 | Noerenberg ............. G01N 7/10 250/282 |
| 2015/0318161 A1* | 11/2015 | Brown .................... H01J 49/26 250/288 |

OTHER PUBLICATIONS

Marshall, et al., "Fourier transform on cyclotron resonance detection: principles and experimental configurations," International Journal of Mass Spectrometry 2015 (2002), pp. 59-75.
Makarov, et al., "Dynamics of Ions of Intact Proteins in the Orbitrap Mass Analyzer", J Am Soc Mass Spectrom 2009, 20, pp. 1486-1495.
Marshall, et al., "Fourier Transform Ion Cyclotron Resonance Mass Spectrometry: A Primer", Mass Spectrometry Reviews, 1998, 17, pp. 1-35.

\* cited by examiner

*Primary Examiner* — Brooke Purinton
(74) *Attorney, Agent, or Firm* — David A. Schell

(57) ABSTRACT

A method is proposed for assessing the vacuum conditions in a mass spectrometer (10) such as an ion cyclotron resonance or orbital trapping mass spectrometer. Such mass spectrometers generate a transient detection signal resulting from ions of one or species in an ion trap (80). The parameters of the trap and/or introduced ions are adjusted so as to cause the decay rate of the transient in respect of the ion species to be dominated by collisional effects. Typically this can be achieved by introducing ions into the trap (80) in quantities such that ion clouds of a particular ion species self bunch. The rate of decay of the transient signal in that case is determined and compared with one or more threshold decay rates. This in turn can provide an indication of vacuum conditions within the trap (80).

25 Claims, 6 Drawing Sheets

METHOD OF ASSESSING VACUUM CONDITIONS IN A MASS SPECTROMETER WITH TRANSIENT SIGNAL DECAY RATES

FIELD OF THE INVENTION

This invention relates to a method of assessing the vacuum conditions in a mass spectrometer, and in particular for assessing the vacuum conditions in the trap of a mass spectrometer of the type that generates a transient signal, such as an Ion Cyclotron Resonance (ICR) or Orbital trapping mass spectrometer.

BACKGROUND OF THE INVENTION

The quality of measurement of a mass spectrometer is related to the vacuum conditions in the mass analyzer. In general, any collision of an analyte ion with another particle inside the mass analyzer changes the trajectory of the analyte ion which in turn has a negative impact on the quality of the measurement. The rate of collisions depends upon the collision cross section σ of ions in the spectrometer, the pressure in the device, and the energy of the ions.

In "Application of the Orbitrap analyzer for Measurement of ion-neutral collision cross sections", Proc. 49$^{th}$ ASMS Conf. on Mass Spec. and Allied Topics, Chicago, Ill., May 27-31, 2001, Hardman et. al. derive a relationship between the pressure within an ORBITRAP™ mass spectrometer, the collision cross section of ions and the resolving power.

Accordingly, it is considered important to monitor the pressure within the ion trap/analyzer of a mass spectrometer, in order to verify that any analysis will be, is, or has been carried out under acceptable conditions. The most common way to do this is to employ an ion gauge located close to the mass analyzer. The exact type of gauge employed depends upon the type of mass analyzer and the pressure range over which it is typically operated. For example, Time of Flight (TOF) mass analyzers are usually operated at higher pressures than analyzers employing axially harmonic trapping, such as ORBITRAP™ or Fourier Transform Ion Cyclotron Resonance (FT-ICR) mass spectrometers. The longer the ion path, the better the pressure should be.

There are several drawbacks of existing methods of pressure monitoring in a mass analyzer. Firstly, UHV gauges tend to be expensive. Secondly, the gauge cannot be positioned within the analysis region. Although the gauge may be positioned close to it, still the pressure measured by the gauge is not the actual pressure where the ions travel so that the measured pressure can only permit an inference of the true conditions where the ions are travelling, are trapped, or are measured. Due to instrument geometry and field considerations, the gauge in FT/MS instruments such as Orbital or ICR is frequently placed away from the actual analysis device. The pressure reading of the ion gauge also depends upon gas type, and the composition of the gas is not known as it depends on several factors such as gas inlets or pumping characteristics of the attached vacuum pumps. The composition of the gas also changes the collision cross sections.

Against this background, it is an object of the present invention to provide an alternative and/or improved method of assessing the vacuum conditions in the ion trap of a mass spectrometer, particularly of the type which generates a transient detection signal.

SUMMARY OF THE INVENTION

According to a first aspect of the present invention, there is provided a method of assessing the vacuum conditions in a mass spectrometer of the type that generates a transient signal, as defined by claim 1.

The quality (mass accuracy etc.) of a mass spectrum generated by an FTMS (e.g. FT-ICR, ORBITRAP™ analyzer or other orbital trapping device) is strongly dependent upon background pressure in the trap. The transient signal from which the mass spectrum is derived results, in general terms, from an overlay of a plurality of sinusoidal signals, and each component signal has its own frequency and decay rate. Each decay rate, in turn, for a given component signal, depends on multiple factors such as frequency, pressure, collision cross section/mean free path and space charge. Hence, extracting a meaningful figure of merit for the vacuum conditions within the trap from the transient detection signal is not a trivial task.

It has been recognised, however, that the transient decay is dominated by two possible mechanisms: dephasing of ions—that is, loss of coherence of an oscillating ion cloud of a single ion species, for example as a result of space charge and field imperfections, and of initial kinetic energy spread of those ions, and scattering losses, as a result of collisions between ions and other particles. One aspect of the present invention relies upon the isolation of the scattering mechanism (which follows a first order exponential decay) in order to provide an assessment of the vacuum conditions within the trap. This is achieved by adjusting the parameters of the trap and/or the ion injection parameters so as to cause the decay rate of at least one ion species to be collision dominated. One preferred way of achieving this is by introducing ions into the trap in quantities such that ion clouds of a particular ion species self-bunch—that is, remain coherent over multiple oscillations within the trap, rather than dephasing due mainly to Coulombic repulsion and source-dependent kinetic energy distribution.

Self-bunched ion groups can be described substantially or entirely by scattering losses. Therefore, the rate of decay of a transient representing self-bunched ions can be used as a good indicator of the vacuum conditions in the trap: a pressure induced transient decay rate for self-bunched ions of a particular ion species can be compared with a known decay rate or rates to determine whether the vacuum within the trap is sufficiently good enough for obtaining acceptably accurate mass spectra, or not.

Where the self-bunched ion species is of known identity, it is possible to estimate a pressure within the trap based upon the determined decay rate and the known collision cross section (or a previously obtained calibration) of the ion species. This pressure can be displayed to a user, thus permitting the existing trap pressure gauge to be removed. This has several benefits: cost, obviously, as well as the removal of a potential source of mechanical unreliability, but primarily the ability to assess the vacuum conditions within the trap based upon actual pressure induced collisions in the trap, rather than by inference from a pressure measured using a vacuum gauge which is typically located adjacent to but not inside the trap (and usually, therefore, in a region of different pressure to that within the trap).

In a simplest form, the method may be implemented by carrying out a pre-scan using just a single ion species introduced into the trap so as to result in self-bunching of that single ion species. In that case, the decay rate of the transient simply and readily provides an indication of the vacuum conditions within the trap.

The single ion species may be isolated either outside (upstream) of the trap, for example in a linear or C-trap used for injection of ions into the trap, in a mass filter, such as a transmission multipole mass filter, in a collision cell in communication with the C-trap, or in the mass analyzer trap itself.

In an alternative, multiple ion species, each self-bunched, can be introduced into the ion trap, and the transient decay signal can be mathematically processed to allow an assessment of the vacuum conditions within the trap. For example, by carrying out a Fourier transform of the transient, and isolating individual frequencies, then carrying out an inverse Fourier transform on each isolated frequency, separate transient decay rates can be obtained for the different ion species. These can be used, together or separately to provide an indication of the acceptability of the vacuum conditions in the trap, particularly where the collision cross sections of the different ion species are known, or simply from peak width.

In still a further generalization of the concept, the trap may be injected with ions of multiple different ions species, only some (or indeed, only one) of which is/are self-bunched. Again, mathematical processing of the transient decay signal can be carried out to isolate the self-bunched ion species within the trap (singular or plural) and to use the decay rates(s) of that/those to assess the vacuum conditions in the trap. For example, the "raw" transient can be digitally heterodyned. Alternatively, a Fourier Transform may be taken of the transient. That Fourier Transform may then be filtered to isolate the self-bunched ion species and then back transformed to the time domain again. Alternative techniques, such as the "harmonic inversion" methods that have been described in our copending publication number WO 2013/171313 A1 may additionally or alternatively be employed.

The data may be obtained either by carrying out a dedicated pre-scan (in which case the resulting decay rate of the transient can be used to provide reassurance that the vacuum conditions in the trap are within acceptable limits) or by suitable processing of a transient (in the manner described above) obtained from an analytical scan, to isolate the self-bunched ion species so as to assess the vacuum conditions within the ion trap based upon the pressure induced transient decay rate.

According to a second aspect of the present invention, there is provided a method of assessing the vacuum conditions within a trap of a mass spectrometer of the type that generates a transient detection signal, in accordance with claim 16.

In this aspect of the invention, no a priori deliberate adjustment of the trap parameters and/or ion injection parameters (such as ion current, to cause self-bunching, for example) is carried out. Instead, the method looks at the obtained transient, or a plurality of transients, and determines, a posteriori, whether the, or any of the transient(s) fits an exponential decay to better than a minimum threshold degree. If the transient decay shape(s) is/are described by an exponential curve to better than that minimum acceptable amount, then it may be concluded that interactions between the ion species that have produced that or those transient(s) are dominated by collisional effects. This in turn permits an assessment of the vacuum conditions within the trap to be assessed, provided only that a transient may be identified which fits the exponential (first order) decay rate to at least an acceptable degree.

Further preferred features of the invention are set out in the accompanying claims and will further become apparent from a consideration of the following specific description of a particularly preferred embodiment.

BRIEF DESCRIPTION OF THE DRAWINGS

The invention may be put into practice in a number of ways, and some preferred embodiments will now be described by way of example only and with reference to the accompanying drawings, in which.

DETAILED DESCRIPTION OF PREFERRED EMBODIMENTS

The invention relates to a method of assessing the vacuum conditions in a trap of a mass analyser of the type that generates a transient signal. In order to provide a general background understanding of the method, however, a brief description of an arrangement suitable for generating a transient signal and/or isolating ion species of interest will first be provided. Nevertheless it is to be understood that the specific arrangement of the apparatus itself is not critical to the implementation of the invention. Hence, the skilled person will understand that any arrangement suitable for obtaining a transient signal might be employed. Examples of suitable trapping mass analysers with which the invention may be implemented include an electrostatic orbital trapping mass analyser (for instance an ORBITRAP™ mass analyzer), or Ion Cyclotron Resonance mass analyser. Typically, suitable trapping mass analysers are FT mass analysers. It is a preferred feature of the mass analyser that it generates the transient signal from the ions in the trap by image current detection.

Figure 1:
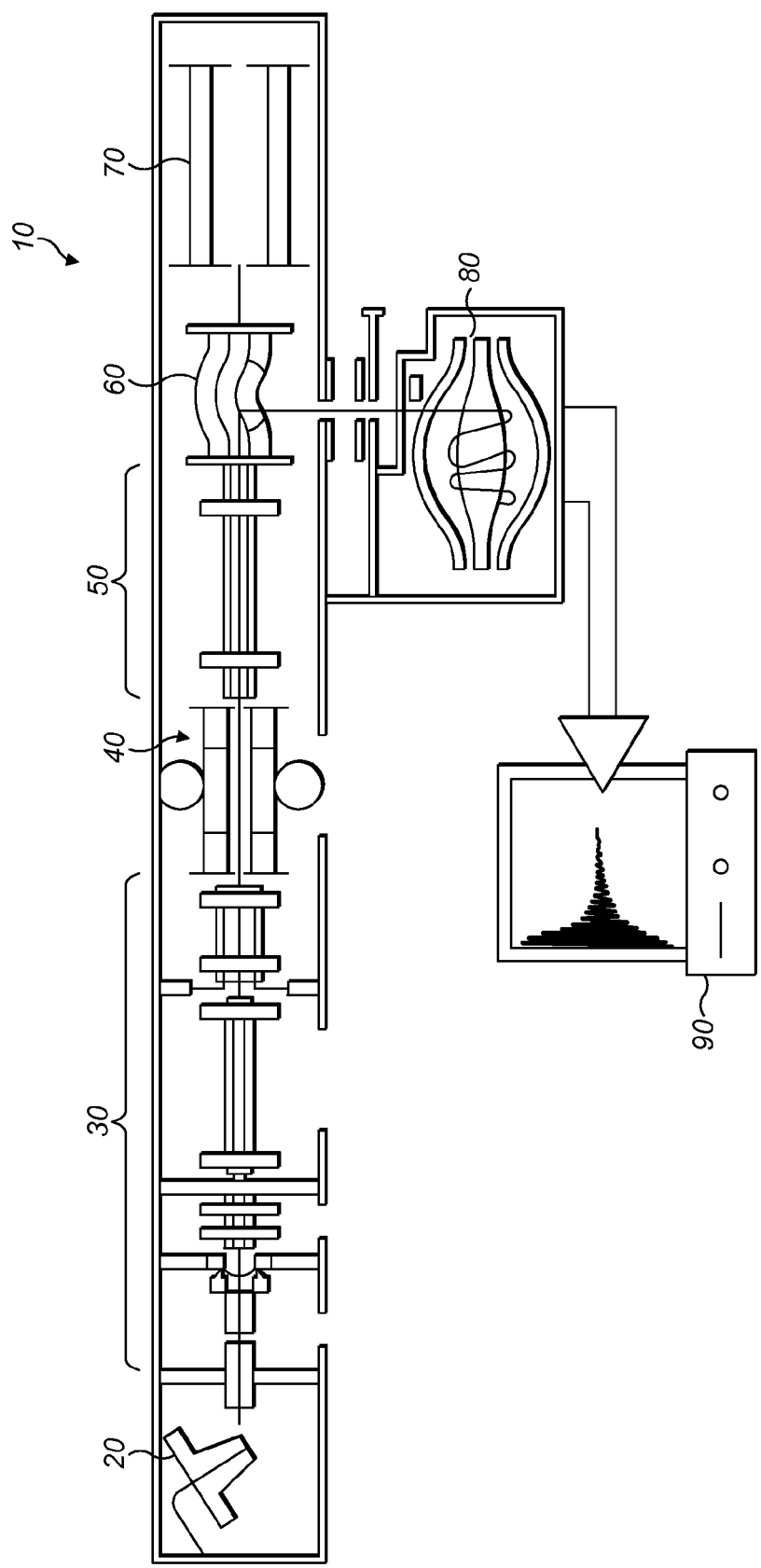
FIG. 1 shows a schematic diagram of a mass spectrometer including a mass analyser of the type that generates a time decaying transient signal, together with a computer for processing the transient signal in accordance with embodiments of the present invention.

Referring then first to FIG. 1, a mass spectrometer 10 is shown in schematic form. The mass spectrometer of FIG. 1 is the LTQ-ORBITRAP™ device manufactured and sold by Thermo Fisher Scientific, Inc. The device comprises a continuous or pulsed ion source 20, such as an electro-spray source. Nebulized ions from the ion source 20 enter ion source optics shown generally at reference numeral 30, which cool and focus the ions from the ion source. The ions then arrive at the LTQ mass analyser 40 where MS or MS$^n$ scan modes can be implemented at the user's request.

Ions remaining in the LTQ 40 are ejected along an axial direction of the mass spectrometer towards further ion optics 50. These ions arrive at a curved linear trap (C trap) 60 where they are accumulated along a longitudinal axis.

Optionally, ions may be ejected along that longitudinal axis towards a collision cell 70 where fragmentation of ions may be carried out using various known methods (electron capture dissociation, collision induced dissociation, etc). The fragmented ions are then returned back along the longitudinal axis from the collision cell 70 to the C trap 60 where they are stored.

Ions in the C trap (whether having arrived directly from the LTQ mass analyser 40 or via the collision cell 70) are then ejected in an orthogonal direction towards an ORBITRAP™ mass analyser 80. In known fashion, ions are squeezed as they enter the ORBITRAP™ mass analyser and, once inside, perform orbital motion around a central electrode whilst also performing oscillations in the axial direction of the trap. Ions of the same mass to charge ratio oscillate within the trap in coherent bunches with a period in the axial direction of the ORBITRAP™ mass analyser that is related to the mass to charge of that ion species.

An image current is induced in ion detectors within the ORBITRAP™ mass analyser as the ion bunches pass by those detectors. The image current is passed to a computer/processor 90. The image current provides a decaying transient signal in the time domain. By carrying out a Fast Fourier Transform (FFT) into the frequency domain, a mass spectrum representing the intensities of the various ion species measured in the ORBITRAP™ mass analyser 80, and their mass to charge ratios, can be obtained.

As will be well understood by the skilled person, the LTQ-ORBITRAP™ device arrangement 10 of FIG. 1 permits high resolution, high mass accuracy and high resolution mass spectrometric data to be obtained. The combination of the LTQ 40, the C-trap 60 and the collision cell 70 allows sophisticated MS" experiments to be carried out, and permits isolation of individual ion species or narrow ranges of ion species from a wider range of ion species introduced into the mass spectrometer 10 by the ion source 20.

The quality—that is, for example, the resolution and mass accuracy of the peaks—of the mass spectrum is a consequence of a number of factors. However the vacuum conditions within the ORBITRAP™ mass analyser 80 are known to be an important parameter.

Figure 2A:
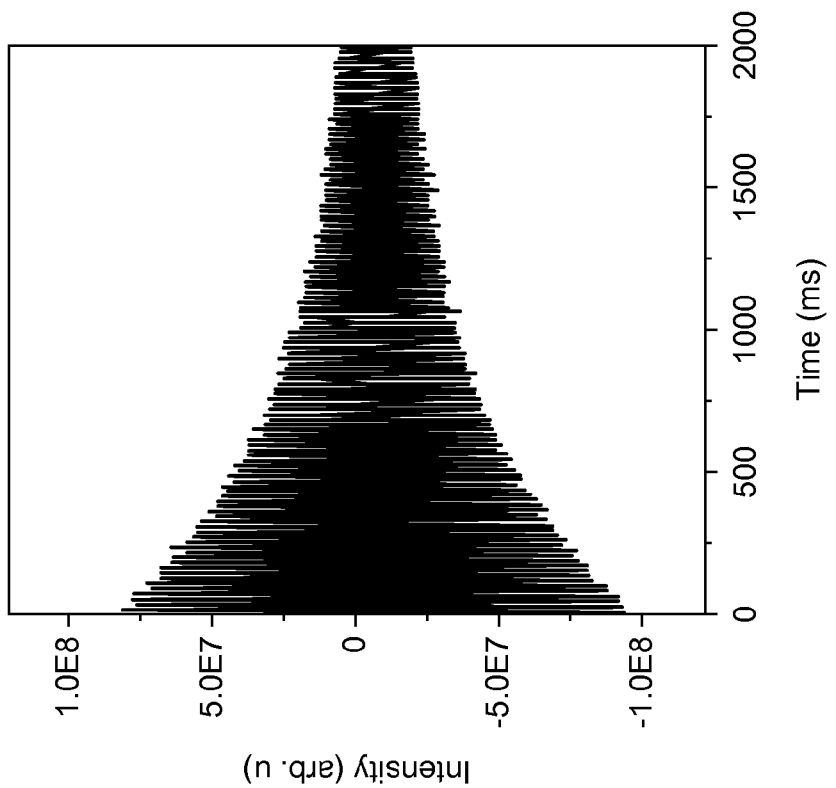
FIGS. 2a and 2b show exemplary transient signals obtained from the mass spectrometer of FIG. 1, with the pressure in the trap of the mass analyser at $1.5 \times 10^{-8}$ mbar and $5 \times 10^{-10}$ mbar respectively.
Figure 2B:
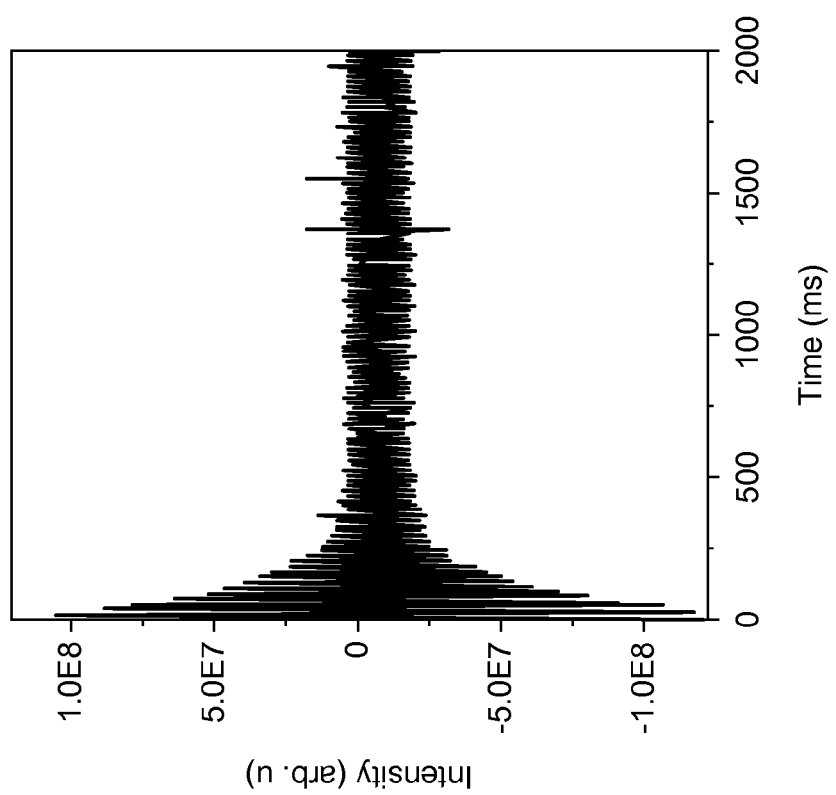

FIG. 2*a* shows illustrates a transient signal generated by a mass spectrometer such as the one shown in FIG. 1, in the case of a relatively poor vacuum of $1.5 \times 10^{-8}$ mbar in the mass analyser (in FIG. 1, the ORBITRAP™ mass analyser 80). FIG. 2*b* shows, by contrast, a transient signal produced by the same mass spectrometer, but in which the pressure in the mass analyser is reduced to $5 \times 10^{-10}$ mbar.

It will immediately be apparent that the signal decay in FIG. 2*a* is much more rapid that in FIG. 2*b*, indicating, qualitatively at least, the importance of the vacuum conditions within the mass analyser. However, the signal is itself an overlay of multiple sinusoidal signals and each component has its own frequency and decay constant. Generally speaking, the decay constant for a single component depends upon several parameters, such as frequency, pressure, collisional cross section and space charge.

Figure 3:
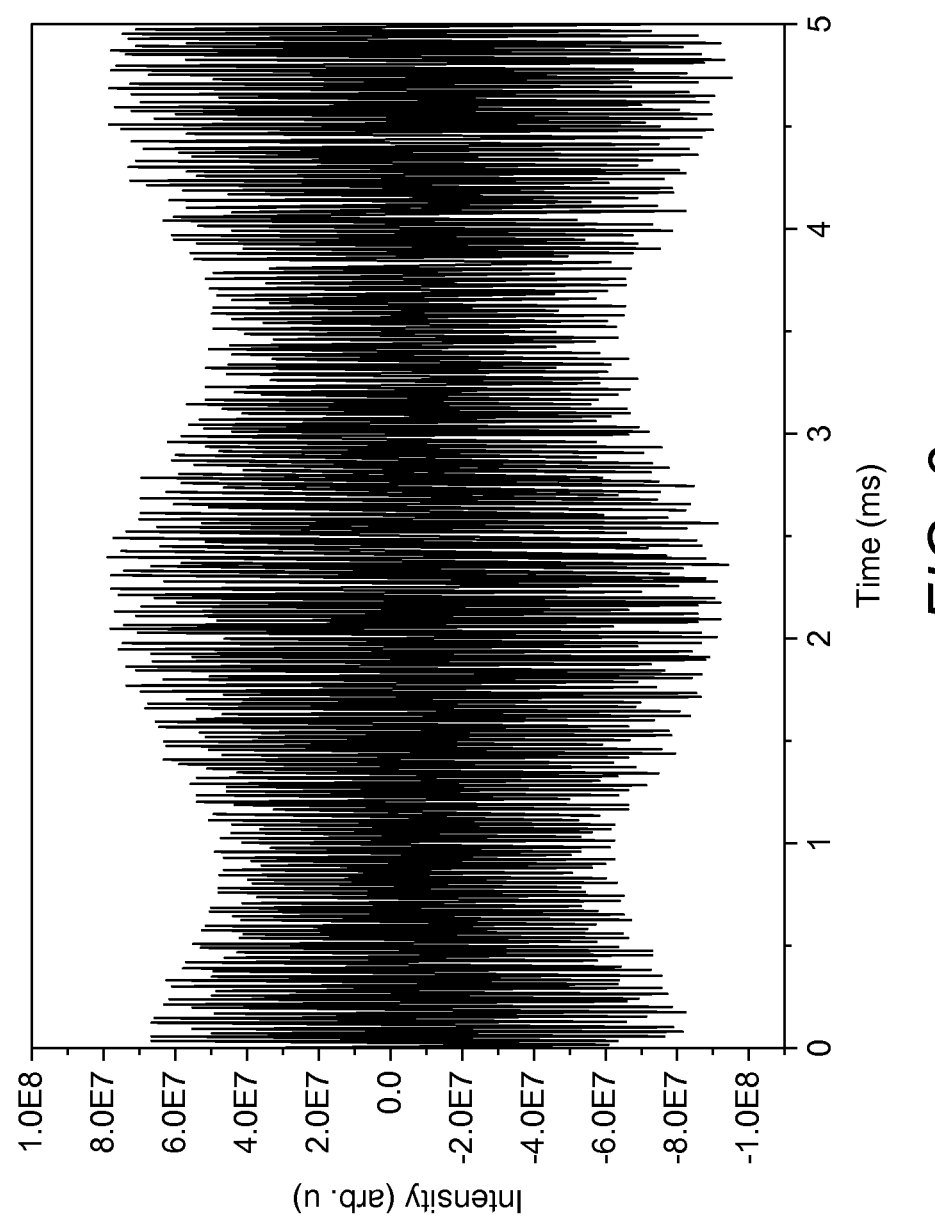
FIG. 3 shows the first 5 milliseconds of the transient of FIG. 2b.

This is shown more clearly in FIG. 3, which represents the first 5 milliseconds of the transient signal shown in FIG. 2*b* (with the relatively higher vacuum within the mass analyser). In summary, whilst a qualitative assessment of the decay rate of a transient signal is possible, it is not mathematically straightforward to infer a useful or meaningful decay constant from a measured transient signal, since there is no single factor contributing to that.

Embodiments of the present invention start from the identification of two primary mechanisms that, between them, typically determine transient decay: dephasing and scattering losses. Dephasing means the loss of coherence of an oscillating ion cloud of a single ionic species. Dephasing is caused by the initial kinetic energy spread and Coulombic repulsion, i.e. space charge and field errors.

Scattering losses, on the other hand, appear when an ion collides with another particle. Under normal operating conditions, scattering losses are dominated by collisions with neutral background molecules. The signal decay caused by scattering depends upon the collisional cross section of the ion, the background pressure within the mass analyser, and the ion energy. The relevant scattering cross section is that for all collisions that lead to the ion being lost from the signal generating cloud, i.e.: loss of a charge, fragmentation, energy change that is big enough for the ion to leave the cloud (that is to say, collision induced dephasing as opposed to dephasing due to other reasons such as space charge effects).

The two dominating mechanisms contribute mathematically distinguishable components to the overall decay of a transient, where the ions from which the transient is derived are subject both to dephasing and scattering loss. Dephasing causes a second order exponential decay of the signal, in the form $\exp(-\tau_2 x^2)$, whereas scattering losses lead to a first order exponential decay of the form $\exp(-\tau_1 x)$.

Thus, the background pressure within the mass analyser represents an (but not the only) indicator of the quality of the vacuum within the mass analyser. If the collision induced contribution to the decay of a transient can be determined, it can then be used as a figure of merit for the vacuum conditions within the mass analyser and hence an indication that the mass analyser is operating within acceptable limits.

The share of the two transient decay mechanisms must therefore be determined for the signal component in order to retrieve the scattering loss rate which can then optionally be used for calculating the pressure.

There is a number of ways of isolating the contribution to the transient decay caused by ion collisions. In general terms, the techniques may be divided into those that require mathematical techniques to separate the contributions of the ion scattering and the dephasing to the overall transient, and those that involve experimentally generating transients from one or more ion species, wherein at least one of the ion species has a decay which is described substantially entirely by scattering losses, without any dephasing. That or those ion species which experience no (or at least, substantially no) dephasing can then be used to provide an estimate of the vacuum conditions within the mass analyser.

To obtain bunches of ions which are dominated by scattering losses without dephasing in accordance with a first preferred embodiment of the invention, it is proposed to exploit a phenomenon known as self-bunching of ions. Self-bunching is a known—and usually unwelcome—phenomenon in experimental mass spectrometry, wherein, when the number of charges within an ion cloud reaches a critical number, dephasing is virtually stopped. In the present case, however, this phenomenon may be employed advantageously; once ions of a particular species are self-bunched, any transient signal representative of that ion species has a decay which is described fully by scattering losses.

In an embodiment, the signal may consist of a self-bunched peak of a single m/z with a known collisional cross section. As will be explained in further detail below, that single self-bunched peak may be obtained by isolating only a single self-bunched ion species for detection within the mass analyser. Then, the decay rate of the resulting transient is a consequence only of the collisions between ions of that species and residual gas molecules within the mass analyser. Alternatively, multiple different ion species may be present in the mass analyser when a transient is obtained. Each of those ion species may themselves be self-bunched, so that the problem reduces to a separation out of the collision induced decay contributions by each of the ions in the mass analyser. Both such concepts (individual self-bunched ion species, and multiple ion species but where all are self-bunched) lend themselves to dedicated pre-scans, in order that these specific conditions can be achieved. Indeed, in a simplest embodiment, the transient decay rate of a known ion species may be calibrated against a pressure gauge beforehand, in a different system.

However, it is not essential that all of the ion species are self-bunched. Indeed, explicitly increasing the number of ions of an ion species that is introduced into the trap, so as to promote self-bunching, is not an essential requirement. It is only a requirement that the decay rate of the transient, or a transient for a particular ion species that is extracted from a "raw" transient of multiple ion species, can be identified as being dominated by collisional effects. By "dominated" is meant that the decay rate, can be fitted to a first order exponential decay curve to a degree that exceeds a minimum threshold. That minimum threshold may, for example, be user or factory set/defined and represents a—typically arbitrary—point at which the decay rate of the transient goes from being exponential to an acceptable degree, to being no longer acceptably exponential. It is to be appreciated, in that regard, that there is no well defined cut-off point in the transition from exponential to non-exponential decay. Even where no ion species are deliberately introduced in large quantities so as to enforce self-bunching, if the dephasing effects can be suppressed adequately, then a transient will nevertheless be dominated by collisional effects.

With that introduction, some specific techniques for obtaining transient decay rates indicative of collisional losses (and hence the vacuum conditions with the mass analyser) will now be described. Although the following techniques will be described using the LTQ-ORBITRAP™ mass spectrometer arrangement of FIG. 1, it is to be understood that this is simply to allow an exemplary illustration of the principles of the present invention and that the means by which the ion species are isolated is not critical. For example, instead of an ORBITRAP™ mass analyzer, an FT-ICR could instead provide the necessary transient decay signal, or even a reflection TOF device such as that described in U.S. Pat. No. 6,888,130. Likewise, the manner by which ions are selected for detection within the mass analyser is not critical and various other methods will be familiar to those skilled in the art.

In a first embodiment, then, ions are generated by the ion source 20. In one embodiment, a user employs a sample containing a calibrant ion species of known identity, to carry out a pre-scan. Ions of that calibrant species, together with any other ions generated by the ion source, are introduced into the LTQ 40 via the ion optics 30. A combination of DC and AC voltages on the electrodes of the LTQ 40 are set so as to cause the LTQ to act as a narrow band pass filter, in that only ions of the calibrant ion species are retained; all other ion species are discarded. Those ions of the calibrant species of interest are ejected axially to the C-trap 60 where they are stored and cooled before ejection to the ORBITRAP™ mass analyser 80.

The ions from the source 20 may be generated quasi continuously or as a series of pulses; in either case, multiple cycles may be necessary before sufficient ions are built up in the C-trap 60 to allow injection into the ORBITRAP™ mass analyser 80 in a quantity sufficient to ensure self-bunching of that ion species in the ORBITRAP™ mass analyser 80.

Once introduced into the ORBITRAP™ mass analyser 80, ions of the calibrant ion species are detected as an image current. The resulting time domain transient signal is stored in a memory of the computer 90.

Once the transient has been obtained and stored, it can be data processed. The raw transient signal itself—obtained from the various ion species detected in the ORBITRAP™ mass analyser 80—may be modelled as a sum of a finite number (K) of decaying harmonic signals of the form $$c_n = \sum_{k=1}^{K} A_k e^{-i\omega_k t_n \gamma_k(t_n)}, \qquad (1)$$

where $c_n$ represents the transient at each of n data points each $A_k$ represents a complex amplitude, and each function $\omega_k$ is the frequency, whereas $\gamma_k$ is the function of decay for each component of the sum. Although other models are possible, a rather general polynomial form can be used to describe the $\gamma_k$'s:

$$\gamma_k = i \sum_{m=0}^{M} \Gamma_m t_n^m, \qquad (2)$$

where the $\Gamma_k$'s are coefficients of a polynomial of order M. In the particular case when M=0, the decay is purely exponential, resulting in Lorentzian spectral peak shapes. Where M=1, on the other hand, a Gaussian component is added, and the resulting spectral shape is referred to as Voigt in spectroscopy.

The decay parameters can be extrapolated directly from the transient. For an exponential decaying transient signal (M=0), such parametric fitting methods as the Filter Diagonalisation Method, or Linear Prediction Based approaches (such as Linear Predictive Coding, Prony method, Maximum Entropy, modified Prony, etc.) return decay parameters as a part of their solution. For M>0, a simple Least Squares method of fitting a model time domain signal $c_n$ (equation 1) to an observed transient would provide the desired information.

However, the method is conceivably sensitive to the initial conditions; therefore, it is potentially beneficial to have an a priori approximate range of values for the parameters.

The processing necessary to determine a pressure induced decay rate from a transient generated by a single ion species in the ORBITRAP™ mass analyser may be achieved by fitting the decay function directly to the transient as set out above. The fitting can also be performed to the envelope of the transient obtained, among other methods, by heterodyning using the resonant frequency of the species ω (e.g. 1). However, embodiments of this invention permit transients generated by multiple ion species to be analysed as well. A number of practical computational approaches exist to allow transient decay rates to be determined from a composite transient signal derived from multiple ion species within the ORBITRAP™ mass analyser 80.

Figure 4:
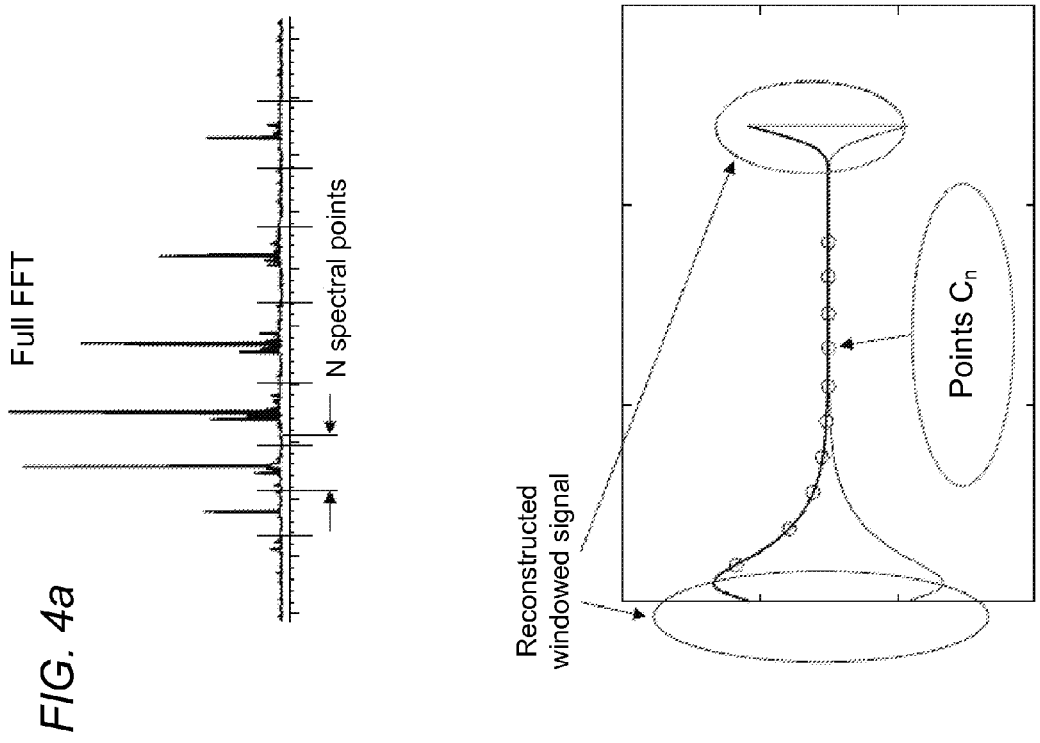
FIGS. 4a, 4b and 4c show successive stages in the isolation of a narrow range of ion species from a larger range.

The time domain signal (the transient) contains the same information as its Fourier Image in the frequency domain. A Fourier Transform (FFT) may be employed to create a frequency spectrum. A peak or a range of peaks of interest (see below) (FIG. 4a) may be identified and isolated by applying a window function to the spectrum.

A smooth window (FIG. 4b) can be used to minimize any truncation artefacts caused by the windowing. A windowed spectrum can be inverted back into the time domain by applying an inverse FFT to create a windowed transient. In order to remove windowing artefacts, it may be desirable to use only the central part of the windowed transient in the subsequent steps. This can be accomplished either by discarding the terminal points (circled in FIG. 4c), or by re-sampling, as this would guarantee that the number of data points is preserved.

In a first approach, one or more ion species of interest to be selected (by the windowing technique, for example) is identified in the Fourier Transform on the basis of known ion species introduced into the trap in sufficient quantities to cause self-bunching of those ions. In that case, an a priori assumption may be made that the decay rate(s) of that or those ion species that are self-bunched, each are dominated by collisional effects so that it can in turn be assumed that such transient(s) will fit an exponential decay. Hence it is desirable—though not essential—that each of the self-bunched ion species is of known identity.

On the other hand, it is possible to proceed with analysis of the "raw" transient, containing information in respect of one or more ion species, without any prior knowledge that the—or any of the—ion species is/are oscillating within the trap with a decay rate of the transient that is dominated by collisional effects. Instead, the transients for the different ion species can be separated for example using the windowing technique above, and then each separate transient can be fitted (or, at least, an attempt can be made to fit each transient) to a first order exponential decay curve. The larger peaks in the frequency domain have been found, empirically, to result from self-bunching (as a general observation) so that the larger peaks typically represent good candidates to commence a curve fitting procedure. For any transients that can be determined to fit a first order exponential decay to better than a predefined criterion, it may be concluded that, in respect of that or those transients, collisional effects dominate. Thus, starting from the assumption that transients whose decay rates fit an exponential decay curve to better than a minimum acceptable degree are a result of those transients being dominated by collisional effects, a figure of merit for the vacuum conditions within the device may be determined, by determining whether that or those decay rates are slower than a minimum threshold or not.

Various criteria could be applied to those transients whose decay rates acceptably fit an exponential curve. For example, an average decay rate for each transient so identified could be compared with a threshold, to assess vacuum conditions. Alternatively, the average could be weighted, with additional weight being provided to those ion species with an m/z closer to that of an analyte ion of interest.

Figure 5:
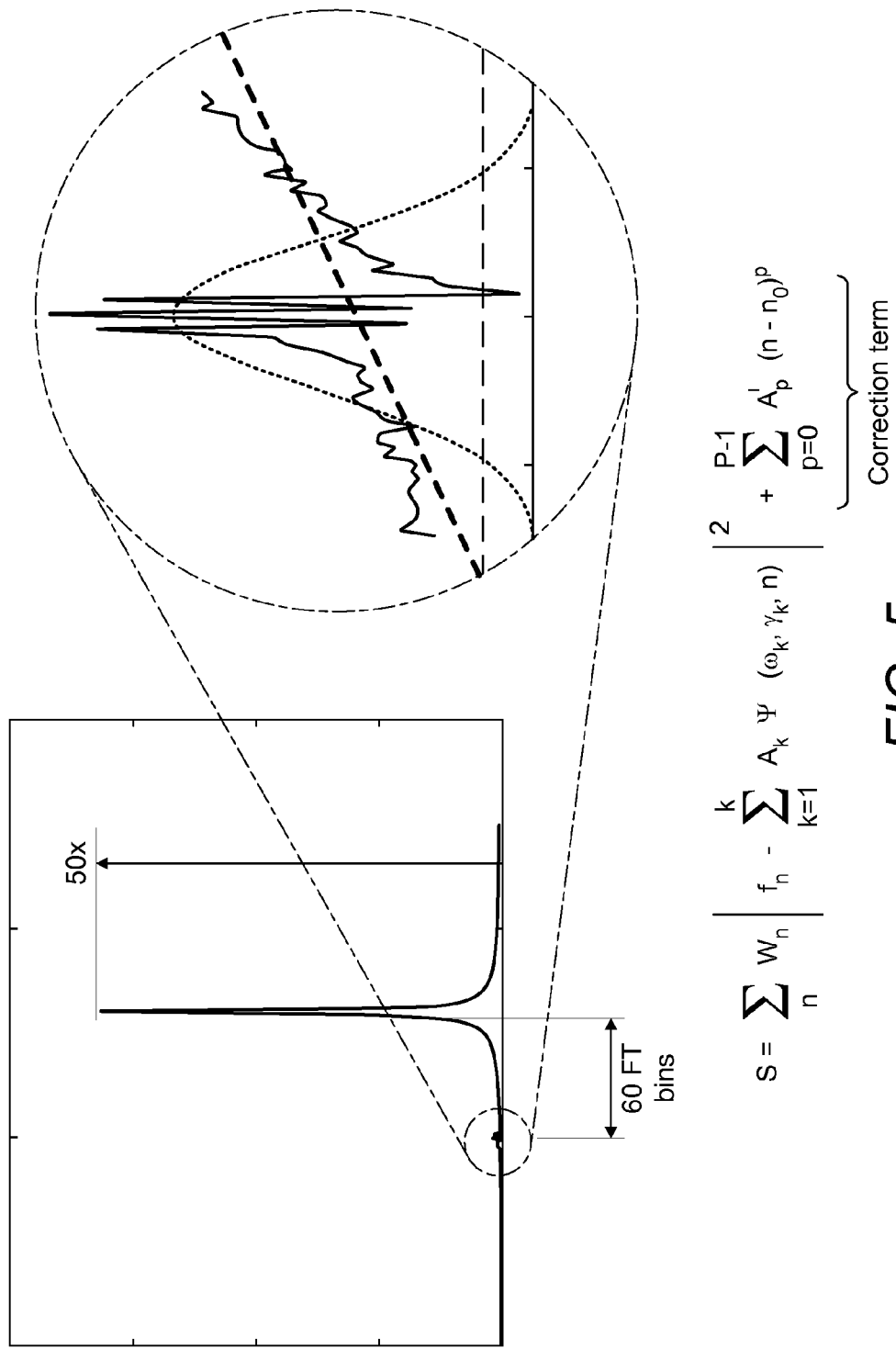
FIG. 5 shows a part of an FFT of a transient generated in accordance with embodiments of the present invention, including a main peak of interest and interfering effects from peaks outside of the main peak of interest.

Instead of carrying out an inverse transform of the windowed signal in the frequency domain, and then analysing the resulting transient as above, fitting can be done directly in the frequency domain, by minimizing the following norm:

$$S = \sum_n W_n \left| f_n - \sum_k A_k \Psi(\omega_k, \gamma_k, n) \right|^2, \quad (3)$$

where $f_n$ is the Fourier Image of the observed transient, $\Psi$ is the Fourier Image of the model signal (equation 1), and $W_n$ is the windowing function. This norm could optionally be augmented by a corrective term, to avoid interfering effects from peaks outside of the range of interest (see FIG. 5):

$$S = \sum_n W_n \left| f_n - \sum_k A_k \Psi(\omega_k, \gamma_k, n) \right|^2 + \sum_{p=0}^{P} A'_p (n - n_0)^p. \quad (4)$$

Although the degree of the polynomial can be arbitrary large, it is sufficient to use P=1.

Alternatively, since it is known that the main contribution to the decay is by collisions, i.e. due to the condition of self-bunching, the peak width may be employed for the measurement of the decay rate, since the full width at half maximum of a Lorentzian peak is twice the decay rate of its transient.

Once a decay rate (or rates) has/have been ascertained using the techniques described above, that or those measured decay rate(s) may then be compared with a lookup table or threshold value for the particular ion species measured. That lookup table or threshold value represents an indication of acceptable vacuum conditions in the ORBITRAP™ mass analyser. Put simply, if the measured decay rate exceeds a predetermined value, then the user may conclude that the vacuum inside the ORBITRAP™ mass analyser 80 is unacceptable—that is, any subsequent experimental data obtained will be of insufficiently high quality. The vacuum within the ORBITRAP™ mass analyser 80 may therefore be adjusted, for example by increasing the amount of pumping by a high vacuum pump or the like. A pre-scan may then be repeated, as described above, to allow a user to confirm that the vacuum conditions within the ORBITRAP™ mass analyser are now acceptable following intervention. Once the vacuum conditions are ascertained to be acceptable (because the decay rate of the transient of the calibrant ion species is slower than a threshold value for that ion species, for example), investigation of a sample of interest can commence.

Generating an ideal transient from a single self-bunched ion species as described in the first embodiment usually requires a dedicated experiment or scan, such that an indication of the vacuum conditions in the mass analyser can be determined prior to the execution of a desired analytical experiment. In practice, it is unusual for the pressure in the ORBITRAP™ mass analyser or other mass analyser to vary dramatically over periods of some minutes. Thus if a pre-scan indicates that the vacuum conditions are within acceptable limits, it is reasonable to infer that any subsequent analytical experiment, carried out within a period of some minutes after the pre-scan, will take place under acceptable vacuum conditions.

Nevertheless, as explained in respect of the alternative embodiment above, it is possible to employ any measured transient, provided only that the decay rate of the transient of at least one of the ion species is dominated by collisional effects, for example, where the ions of that species are self-bunched. This allows an ex post facto determination of the vacuum conditions from an analytical measurement of a sample of interest, provided only that it is possible to separate the different decay rates of the ion species from the general transient, and that at least one of these has a decay rate that is collisionally dominated. In that case, however, the increased number of parameters will increase the error of the measurement.

It is desirable though not essential to know the collisional cross section of the investigated ion species. Often known background ions (e.g. plasticisers) are present, even in a non-dedicated scan. These can be used either by evaluating an analytical measurement or by introducing a dedicated single ion mode (SIM) scan on this ion. With knowledge of the collisional cross section of the particular species of the self-bunched ions, it is possible to estimate the pressure in the mass analyser, for example by using the relationship between pressure and collisional cross section derived in the above referenced Hardman et. al. paper.

Ion energies in the ORBITRAP™ mass analyser typically lie within the range 1-2 kV per charge, meaning that the hard sphere model is the most appropriate. Within this model, the relaxation time for ions with mass-to-charge ratio m/q and energy qV is $$\tau = \frac{1}{n\sigma v} = \frac{kT}{p\sigma\sqrt{\frac{2qV}{m}}} \quad (6)$$

where v is the ion velocity, n is the concentration of residual gas at pressure p and temperature T, k= the Boltzmann constant (1.38 $10^{-23}$ J/K), and $\sigma$ is the total collision cross-section. These collisions limit the frequency resolving power (FWHM) for magnitude spectra to $$R_f = \frac{1}{2\sqrt{3}}\omega\tau \quad (7)$$

As a result, the total collision cross-section may be derived as:

$$\sigma = \frac{1}{2\sqrt{6}}\sqrt{\frac{k}{V}}\frac{kT}{pR_f} \quad (8)$$

For a particular construction of the ORBITRAP™ mass analyser at room temperature, this expression could be reduced to:

$$\sigma = \frac{6}{pR_f}A^2 \quad (9)$$

Where p is expressed in Pa.

V in this context is the injection voltage, giving an Energy (qV).

In an even more general way an arbitrary ion can be used. The collisional cross section can be estimated on mass and charge of the ion. Again either an analytical or a dedicated SIM scan can be used for evaluation of the vacuum conditions in the mass analyser and, where the collisional cross section is known or can be estimated, an estimate of pressure. Although the error in the most general case (non-dedicated scan of an unknown) will be substantial, the precision can be high enough to conclude whether the vacuum is within expectations.

As a consequence of the ability to estimate the vacuum conditions in the mass analyser from the pressure induced transient decay rate, the pressure/vacuum gauge adjacent to that mass analyser may be removed. This is particularly true where the measured transient decay rate is derived from the analyte ion of interest, or an ion of similar mass to charge ratio.

Figure 6:
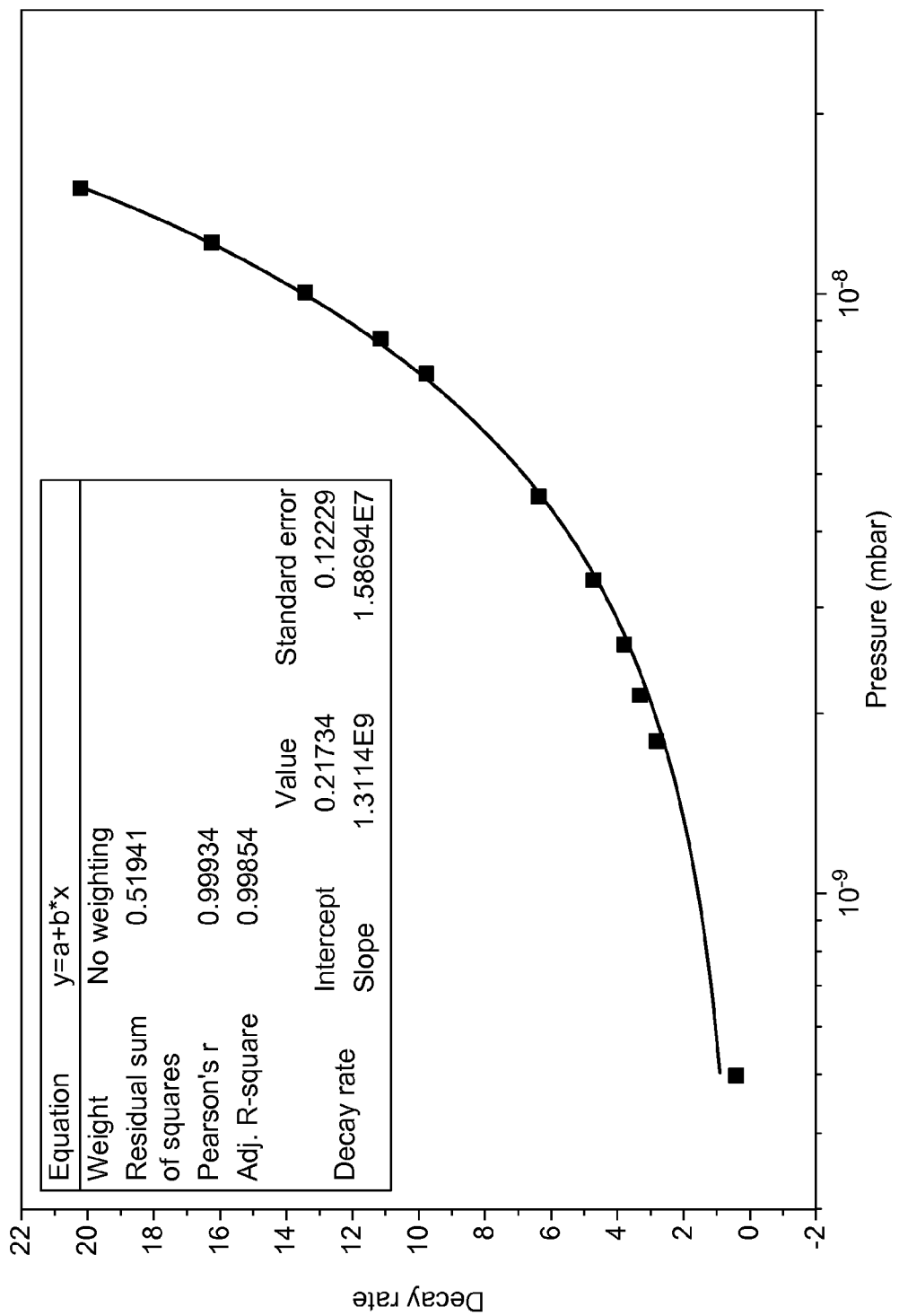
FIG. 6 shows a plot of measured transient decay rate as a function of measured pressure in the trap of the mass analyser of FIG. 1.

FIG. 6 shows experimental evidence for the correlation between measured transient decay rate using the techniques outlined above, and pressure as measured by a vacuum gauge adjacent to the mass analyser. Transients have been recorded over a wide pressures range, and decay rates for the scattering losses have been calculated. The correlation of the pressure measured with an ion gauge and the calculated decay rates, as shown in FIG. 6, is excellent.

Although a specific embodiment of a preferred method has been described, it will be recognised that a number of alternative techniques maybe employed.

The invention claimed is:

1. A method of assessing the vacuum conditions within a trap of a mass spectrometer, of a type that generates a transient detection signal, comprising:
    (a) introducing at least one ion species into the trap;
    (b) generating a transient detection signal of the ions in the trap, the parameters of the trap and/or the introduced ions being adjusted so as to cause the decay rate of the transient in respect of the, or at least one of the, introduced ion species to be dominated by collisional effects via self-bunching;
    (c) determining the rate of decay of the transient signal in respect of the, or at least one of the, ion species where the decay rate is dominated by collisional effects; and
    (d) comparing the determined rate of decay of the transient detection signal with one or more threshold decay rates, so as to assess the vacuum conditions within the trap.

2. The method of claim 1, wherein the, or at least one of the, ion species in the trap is introduced in a quantity sufficient to cause self-bunching of those ions.

3. The method of claim 2, further comprising introducing a single ion species into the trap in the said sufficient quantity, such that the resultant transient detection signal has a decay rate resulting substantially from pressure induced collisions by that single ion species.

4. The method of claim 3, wherein the single ion species is of known identity, the method further comprising estimating the pressure in the trap based upon the determined decay rate of the transient and upon a known property of the single ion species.

5. The method of claim 4, wherein the known property of the single ion species is the collision cross section of that ion species.

6. The method of claim 3, wherein the step of introducing a single ion species into the trap comprises generating, at an ion source, a plurality of ions of multiple different ion species, and isolating only those ions of the single species prior to introduction into the trap.

7. The method of claim 6, wherein the step of isolating only those ions of the single species comprises introducing ions of a plurality of ion species generated by the ion source into an ion storage device upstream of the trap, and ejecting only ions of the single ion species from the ion storage device into the trap.

8. The method of claim 2, further comprising introducing multiple ion species into the trap, each in a quantity sufficient to cause self-bunching of the ions of each ion species, whereby the resultant transient detection signal decays at a rate resulting substantially from pressure induced collisions by each of the multiple ion species.

9. The method of claim 8, wherein each of the introduced ion species is of known identity, the method further comprising estimating the pressure in the trap based upon the determined decay rate of the transient and upon a known property of each ion species.

10. The method of claim 9, wherein the known property of each ion species is the collision cross-section of that ion species.

11. The method of claim 2, further comprising introducing one or more ion species into the trap in quantities insufficient to cause self-bunching, along with the one or more species that do self-bunch, the method further comprising:
   isolating from the generated transient detection signal, those parts that result from the self-bunched ion species within the trap prior to the step (c) of determining the rate of decay of the transient in respect of the self-bunched ions.

12. The method of claim 11, wherein the step of isolating from the generated transient detection signal those parts that result from the self-bunched ion species within the trap comprises eliminating unwanted frequencies from the transient signal by signal processing.

13. The method of claim 12, wherein the step of signal processing comprises digitally filtering the transient detection signal.

14. The method of claim 12, wherein the step of signal processing comprises carrying out a Fourier transform of the transient detection signal, selecting a window within the frequency domain, and then transforming the selected frequency window back to the time domain.

15. The method of claim 12, wherein the step of signal processing comprises digitally heterodyning the transient detection signal.

16. A method of assessing the vacuum conditions within a trap of a mass spectrometer, of a type that generates a transient detection signal, comprising:
   (a) introducing at least one ion species into the trap;
   (b) generating a transient detection signal of the ions in the trap;
   (c) determining the extent to which the generated transient detection signal, or a transient signal or signals derived therefrom fits to a first order exponential decay indicative of a dominance of collisional effects in the generated transient signal, or the transient signal(s) derived therefrom;
   (d) where the rate of decay of the generated transient detection signal, or the transient signal(s) derived therefrom is determined, in the step (c), to fit the first order exponential decay to an extent greater than a threshold extent, determining the rate of decay of the generated transient signal, or the transient signal(s) derived therefrom; and
   (e) comparing the determined rate of decay of the transient detection signal, or the transient signal(s) derived therefrom with one or more threshold decay rates, so as to assess the vacuum conditions in the trap.

17. The method of claim 16, wherein the step (a) comprises introducing a plurality of ion species into the trap, the method further comprises, after the step (b) of generating a transient detection signal, the further step of generating, from that transient detection signal, one or more derived transient signals and representative of a corresponding one or more of the plurality of introduced ion species.

18. The method of claim 17, further comprising obtaining a plurality of derived transient signals from the generated transient signal, representative of respective ones of the plurality of introduced ion species, the step (c) comprising determining the extent to which each of the derived transient detection signals fit the first order exponential decay, the step (d) comprising determining the rate of decay of each of those derived transient detection signals that fit the first order exponential decay to an extent greater than the threshold extent; and the step (e) comprising comparing the determined rates of decay of at least one of the derived transient decay signals with the threshold decay rate or rates, to assess the said vacuum conditions in the trap.

19. The method of claim 18, further comprising the step of determining the extent to which the derived transient detection signals fit to a higher order exponential decay; and, in respect of those derived transient detection signals that fit a higher order exponential decay to greater than a threshold extent, excluding that or those derived transients from the comparison of a rate of decay with the threshold rate of decay.

20. The method of any of claim 16, further comprising providing an indication of the pressure within the trap, based upon the determined rate of decay of the generated transient detection signal or the transient signal(s) derived therefrom.

21. A non-transitory computer readable medium comprising computer code which, when executed, carries out the method steps of claim 1.

22. A mass spectrometer of a type which generates a transient detection signal, the mass spectrometer having a computer controller loaded with the software of claim 21.

23. The mass spectrometer of claim 22, comprising an ion trap and which does not have a pressure gauge adjacent to the trap.

24. The mass spectrometer of claim 22, of the orbital trapping or Fourier Transform Mass Spectrometer (FTMS) type.

25. The method of claim 6, wherein the step of isolating only those ions of the single species comprises passing a plurality of ion species generated by the ion source into a mass filter upstream of the trap so that only ions of the single ion species pass into the trap.

* * * * *

UNITED STATES PATENT AND TRADEMARK OFFICE
CERTIFICATE OF CORRECTION

| | | |
|---|---|---|
| PATENT NO. | : 9,460,905 B2 | Page 1 of 1 |
| APPLICATION NO. | : 14/686012 | |
| DATED | : October 4, 2016 | |
| INVENTOR(S) | : Konstantin Aizikov et al. | |

It is certified that error appears in the above-identified patent and that said Letters Patent is hereby corrected as shown below:

In the Claims

Claim 20, Line 1, Column 14:
replace "The method of any of claim 16, ..."
with --The method of claim 16, ...--

Signed and Sealed this
Seventh Day of March, 2017

Michelle K. Lee
*Director of the United States Patent and Trademark Office*